June 24, 1930.   J. D. DYER   1,765,866
AUTOMOBILE INCLOSURE AND SHIELD CONSTRUCTION
Filed Sept. 13, 1926   2 Sheets-Sheet 1
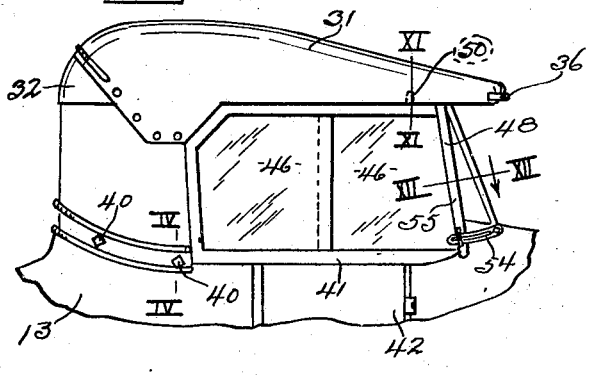
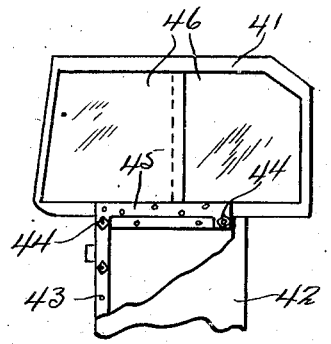
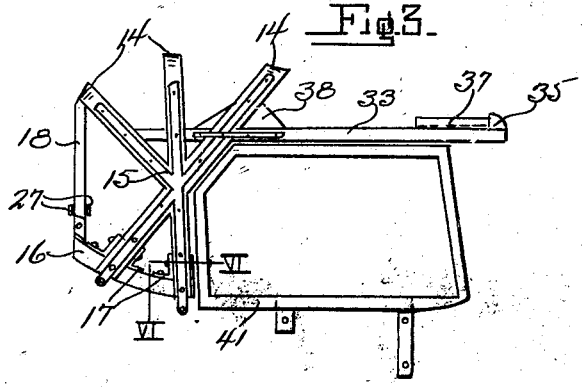
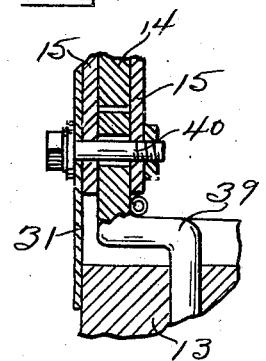
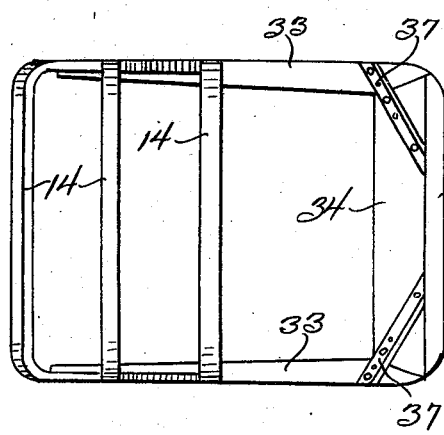
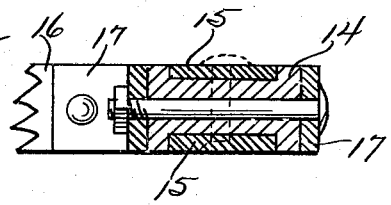
INVENTOR.
James D. Dyer
BY
ATTORNEY.

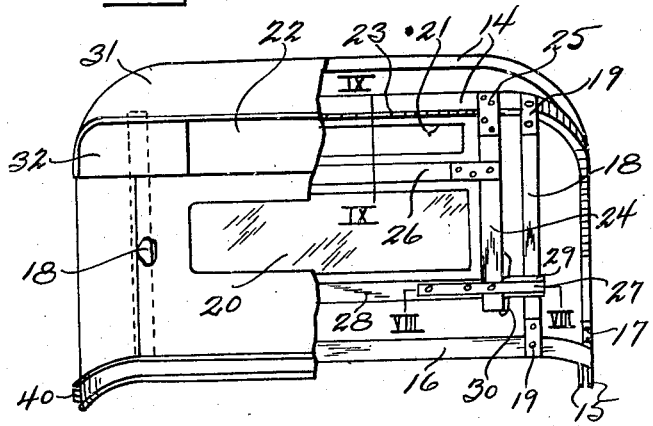
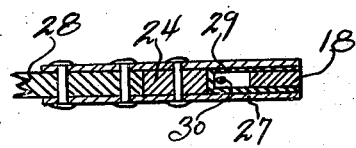
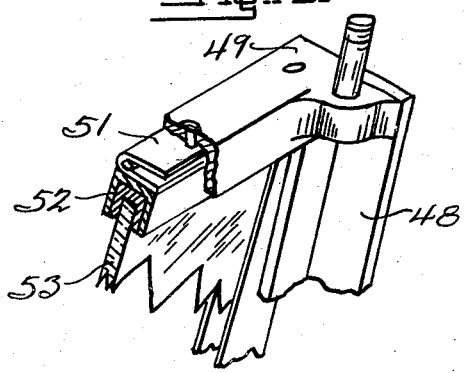
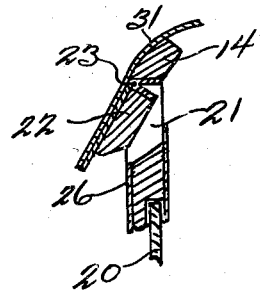
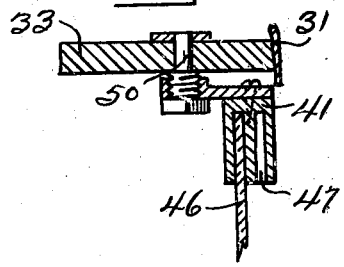
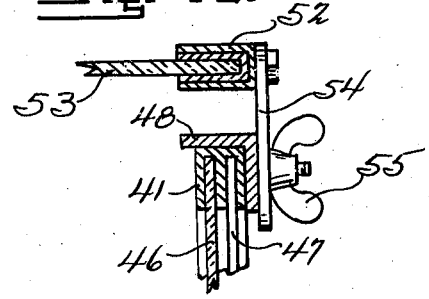
INVENTOR.
James D. Dyer Patented June 24, 1930

1,765,866

UNITED STATES PATENT OFFICE

JAMES D. DYER, OF KANSAS CITY, MISSOURI

AUTOMOBILE INCLOSURE AND SHIELD CONSTRUCTION

Application filed September 13, 1926. Serial No. 135,105.

This invention relates to automobile inclosure and a wind shield construction especially adapted to be used in connection with said inclosure, the primary object of which is the provision of a semi-rigid top which may be affixed and removed from the body of the automobile without folding or collapsing the top in any way.

Another object of my invention is to provide a new and novel structure for semi-rigid tops to be used on automobiles, which is provided with cooperating side walls carried in a convenient manner by the swinging doors of the automobile, which side walls fit into the extremely narrow post which has been provided to perform the duty of supporting the forward end of the top as well as to form a portion of the wind shield member.

An even further object of the instant invention is the provision of a semi-rigid automobile inclosure which is equipped with a large ventilator and window in the back thereof, which ventilator and window is suspended from one of the top bows of the inclosure in such a way that straining side movement and abrupt jars are not transmitted to the window glass and ventilator door.

Many minor objects and detailed construction will appear during the course of the following specification.

Referring to the accompanying drawings wherein:

Figure 1 is a side elevation of an automobile inclosure and shield made in accordance with the present invention and showing the same secured in place on an automobile;

Fig. 2 is a fragmentary view of the automobile door showing same entirely removed and carrying the side member of the inclosure;

Fig. 3 is a side elevation of the semi-rigid inclosure without the cooperating shield construction and with the covering member and glass entirely removed to more clearly show the relation of the bows;

Fig. 4 is an enlarged detail cross section showing the preferred way of affixing the inclosure to the automobile body taken on line IV—IV of Figure 1;

Fig. 5 is a top plan view of the inclosure frame as shown in Fig. 3;

Fig. 6 is an enlarged detail section through one of the bow members taken on line VI—VI of Fig. 3;

Fig. 7 is a back view of the inclosure with half of the cover material removed to specifically illustrate the novel back structure and the means for movably suspending the ventilator and window;

Fig. 8 is an enlarged detail view taken on line VIII—VIII of Fig. 7;

Fig. 9 is a similar view taken on line IX—IX of Fig. 7;

Fig. 10 is a fragmentary perspective view of one upper corner of the shield and supporting frame construction;

Fig. 11 is an enlarged detail sectional view taken on line XI—XI of Fig. 1; and

Fig. 12 is a fragmentary section taken on line XII—XII of Figure 1.

Similar reference characters refer to like parts throughout the several views.

The numeral 13 designates the body of an ordinary automobile to which may be affixed an inclosure and shield made in accordance with my invention. It is well known in the art that automobile inclosures of the non-rigid type are objectionable in that they soon become out of shape and do not retain the original desired appearance. On the other hand it is found expensive and oftentimes impossible to equip the ordinary automobile body with a rigid inclosure which carries suitable windows and other desirable equipment.

Accordingly, the present invention contemplates the provision of a semi-rigid inclosure which may be attached to practically any automobile body. Referring at this time to the top construction in itself, the same may be made up of a plurality of top bows 14 which are rigidly secured together as shown in Fig. 3 and which are further reinforced through the use of a countersunk metal spider 15 which should be riveted or otherwise secured to the bows along the sides thereof and below the point where the curve thereof begins. After these several top bows 14 are secured together, a bottom bow 16 is placed, which conforms to the contour of the edge of the automobile body upon which it is to rest. This bottom bow 16 may be secured in place through the use of angle brackets or the like 17 which join the bottom bow to the lower ends of the top bows 14.

To carry out one of the important features of my invention, I provide a connecting brace 18 which joins the rearmost top bow 14 to the bottom bow 16. This connecting brace should be secured as at 19 to each of the bows just mentioned and there should be one brace adjacent each side of the back, as shown in Fig. 7. Between these braces 18 is suspended the window 20 in such a manner that severe strain will not be imparted thereto to break the glass or otherwise force the same out of the desired position. Immediately above this window 20 is provided a ventilator 21 having a door 22 which swings out at the bottom in such a way that rain will not enter the opening 21 when the ventilator is in use. This door 22 is hingedly secured as at 23 to one of the top bows 14. The ends of the ventilator opening are formed by a pair of arms 24 which drop down from the rearmost top bow 14 as shown in Fig. 7. This arm 24 is secured to said top bow 14 in any suitable manner, such as shown at 25 and an intermediate cross brace 26 joins the two arms 24 and separates the window from the ventilator opening 21. The top of this cross brace 26 is beveled slightly as shown in Fig. 9 and the door 22 cooperates with this beveled edge in making a tight joint. To preclude arms 24 from swinging to the front and rear, the same is provided with a pair of fingers 27 rigidly secured to the lower member 28 of the window frame as shown in Fig. 8. These fingers project outwardly from each arm 24 and straddle connecting brace 18 in such a manner that slight motion from said side is permitted.

To preclude objectionable noises and squeaks these fingers carry a U-shaped piece 29 which may be formed of any woven fabric or similar material. This member may be held in place through the use of any ordinary wire or cable 30. After the parts just set forth have been assembled, the inclosure proper is covered with any suitable material 31 which should be padded from the wearing effect of the various posts and braces in the well known manner.

In alignment with the ventilator door 22, it is preferred to form a dicky 32 which will carry out the pleasing lines of the semi-rigid inclosure. The sides and forward portion of the top may be formed of a pair of side pieces 33 which are joined at their forward ends by a plate 34 which carries a block 35 to which is secured the forward edge of the material 31 and which also supports gutter 36. An angle iron 37 should extend across the joint formed between the side pieces 33 and the plate 34 to render the joint secure and if necessary a metal plate 38 may be secured to one of the top bows 14 to brace the rear end of side pieces 33. After the top has been covered and suitable lining has been placed inside the inclosure, the same may be riveted into place on the automobile body 13 and secured in that position by causing the lower ends of two of the reinforcing straps to straddle a bracket 39 carried by the automobile body 13.

Any suitable bolt 40 may be used to engage bracket 39 and it is to be noticed that there are but two points of connection on each side of the top. In this manner the top is readily removed to be replaced by any other similar device. To complete the inclosure proper a side member including a frame 41 should be affixed to the door 42 of the automobile body 13. It is preferred to reinforce door 42 with an angle iron 43 which carries a number of pins 44 adapted to engage the strap iron bracket 45 secured to frame 41 as shown in Fig. 2.

This construction permits of the door carrying the entire frame 41 which closes the open side of the inclosure shown in the drawing In the event the inclosure is made to be applied to a larger car each door may carry a part of the side in a similar manner. Frame 41 slidably supports a pair of windows 46 in such a way that they may be pulled along grooves 47 to the open or closed position.

In connection with this inclosure it has been found desirable to use a specific form of wind shield which is constructed to provide clear vision yet is strong enough to support the forward part of the top proper. This shield construction is simply a frame of angle iron which includes an upright 48 on each side of the front, which are joined at their upper ends by a cross piece 49 welded into place in such a manner that the uprights will present a rearwardly extending side wall, while the connecting piece 49 has its upper side wall extending forwardly.

As is shown in Fig. 1 and Fig. 12 the forward side of frame 41 positions itself within the walls of upright 48 when the door of the car is closed and the inclosure side is in closed position It is to be seen that this upright 48 and the portion of frame 41 extending there along will not obstruct the view of the driver to any appreciable extent, the nesting of these two members is desirable As this nesting takes place, the wind shield may rest directly against and in front of upright 48. To secure positive nesting the upper member of frame 41 is hingedly attached to the adjacent side piece 33 through the use of a pivot pin 50 and the construction shown in Fig. 11. As shown in Fig. 1 this pivot pin should be in axial alignment with the hinge pins of the door 42. Providing a bearing at the top of frame 41 also precludes displacement. The forward part of the door rests on the uprights 48 and the wind shield proper is hingedly attached to member 49 as shown in Fig. 10. The hinge 51 is secured to the forwardly extending side and the frame 52 which carries the glass 53 may swing out away from uprights 48 to any position within the limits of a securing bracket 54 which may be retained in adjusted position through the means of any suitable thumb nut 55.

It is desired to have member 34 wide so that the door will project far over the top of the shield to present an appearance such as that shown in Fig. 1.

It has been found that an inclosure and shield construction of this character will present a very neat appearance and while the preferred form of the invention has been illustrated and described, it is desired to be limited only by the scope of the appended claims.

Having thus described my invention, what I desire to secure by Letters Patent is:

1. In an automobile inclosure and shield construction, a side frame supported by the door of the automobile, an angle iron part supporting the shield member and means for supporting said side frame to guide the front side thereof against the inner side of said angle iron as the door is closed.

2. In an automobile inclosure and shield construction, a side frame supported by the door of the automobile, an angle iron shield supporting frame, the uprights of said angle iron shield supporting frame having rearwardly extending sides, the upper connecting member of said angle iron frame having a forwardly extending side whereby means for supporting the shield and housing one edge of the closed side frame is provided.

In testimony whereof, I hereunto affix my signature this 24th day of August, 1926.

JAMES D. DYER.